(12) United States Patent
Tate, Jr. et al.

(10) Patent No.: US 8,359,126 B2
(45) Date of Patent: Jan. 22, 2013

(54) METHOD TO RESOLVE A REMOTE ELECTRICAL OUTLET FOR AN ELECTRICALLY-POWERED VEHICLE

(75) Inventors: Edward D. Tate, Jr., Grand Blanc, MI (US); John W. Suh, Palo Alto, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 358 days.

(21) Appl. No.: 12/766,973

(22) Filed: Apr. 26, 2010

(65) Prior Publication Data
US 2010/0280678 A1  Nov. 4, 2010

Related U.S. Application Data

(60) Provisional application No. 61/174,106, filed on Apr. 30, 2009.

(51) Int. Cl.
  *H02J 7/00* (2006.01)
(52) U.S. Cl. .................... 700/297; 320/109; 701/300
(58) Field of Classification Search .................. 700/297; 320/109; 701/300
  See application file for complete search history.

(56) References Cited

U.S. PATENT DOCUMENTS

| | | | |
|---|---|---|---|
| 6,614,204 B2 * | 9/2003 | Pellegrino et al. | 320/109 |
| 7,038,425 B2 | 5/2006 | Chuang | |
| 2005/0010797 A1 | 1/2005 | Rushworth | |
| 2008/0040479 A1 * | 2/2008 | Bridge et al. | 709/224 |
| 2009/0091291 A1 * | 4/2009 | Woody et al. | 320/109 |
| 2009/0138345 A1 * | 5/2009 | Dawson et al. | 705/13 |
| 2009/0210357 A1 * | 8/2009 | Pudar et al. | 705/412 |
| 2009/0281679 A1 | 11/2009 | Taft et al. | |
| 2010/0017249 A1 * | 1/2010 | Fincham et al. | 705/8 |
| 2010/0114798 A1 * | 5/2010 | Sirton | 705/412 |
| 2010/0141203 A1 * | 6/2010 | Graziano et al. | 320/109 |
| 2010/0161481 A1 * | 6/2010 | Littrell | 705/40 |
| 2010/0161482 A1 * | 6/2010 | Littrell | 705/40 |
| 2010/0274690 A1 * | 10/2010 | Tate, Jr. | 705/30 |
| 2011/0282535 A1 * | 11/2011 | Woody et al. | 701/22 |

OTHER PUBLICATIONS

U.S. Appl. No. 12/766,963, filed Apr. 26, 2010, Tate.
U.S. Appl. No. 12/766,968, filed Apr. 26, 2010, Tate.
U.S. Appl. No. 12/766,973, filed Apr. 26, 2010, Tate.

* cited by examiner

Primary Examiner — Ryan Jarrett

(57) ABSTRACT

A method for operating a charging stall having a known geographic location configured to electrically charge an electrically-powered vehicle includes communicating a first message to a remote access server from a subject vehicle, the first message including geographic location information corresponding to the subject vehicle, detecting a presence of a parked vehicle at the charging stall with a monitoring system signally connected to a monitoring controller, communicating a second message to the remote access server from the monitoring controller, the second message comprising the detected presence of the parked vehicle at the charging stall, resolving that the parked vehicle at the charging stall comprises the subject vehicle based upon the first and second messages, and activating a power access control device at the charging stall to permit electric power flow through a corresponding electric power outlet.

6 Claims, 4 Drawing Sheets

METHOD TO RESOLVE A REMOTE ELECTRICAL OUTLET FOR AN ELECTRICALLY-POWERED VEHICLE

CROSS-REFERENCE TO RELATED APPLICATIONS

This application claims the benefit of U.S. Provisional Application No. 61/174,106, filed Apr. 30, 2009, which is incorporated herein by reference.

TECHNICAL FIELD

This disclosure is related to electric vehicle recharging.

BACKGROUND

The statements in this section merely provide background information related to the present disclosure and may not constitute prior art.

Electrically powered vehicles use electric power for propulsion and include electric vehicles, range-extended electric vehicles, and plug-in hybrid electric vehicles. Electrically powered vehicles are configured to reduce direct consumption of fossil fuels. Electrical energy storage devices for such vehicles may need to be recharged. Opportunity charging at various locations during vehicle key-off periods can appreciably decrease the amount of fossil fuel used on-board the electrically powered vehicle. Methods for connecting to an electric power distribution system for recharging may use mechanisms to meter energy consumption and reconcile account billing.

SUMMARY

A method for operating a charging stall having a known geographic location configured to electrically charge an electrically-powered vehicle includes communicating a first message to a remote access server from a subject vehicle, the first message including geographic location information corresponding to the subject vehicle, detecting a presence of a parked vehicle at the charging stall with a monitoring system signally connected to a monitoring controller, communicating a second message to the remote access server from the monitoring controller, the second message comprising the detected presence of the parked vehicle at the charging stall, resolving that the parked vehicle at the charging stall comprises the subject vehicle based upon the first and second messages, and activating a power access control device at the charging stall to permit electric power flow through a corresponding electric power outlet.

BRIEF DESCRIPTION OF THE DRAWINGS

One or more embodiments will now be described, by way of example, with reference to the accompanying drawings, in which.

DETAILED DESCRIPTION

Figure 1:
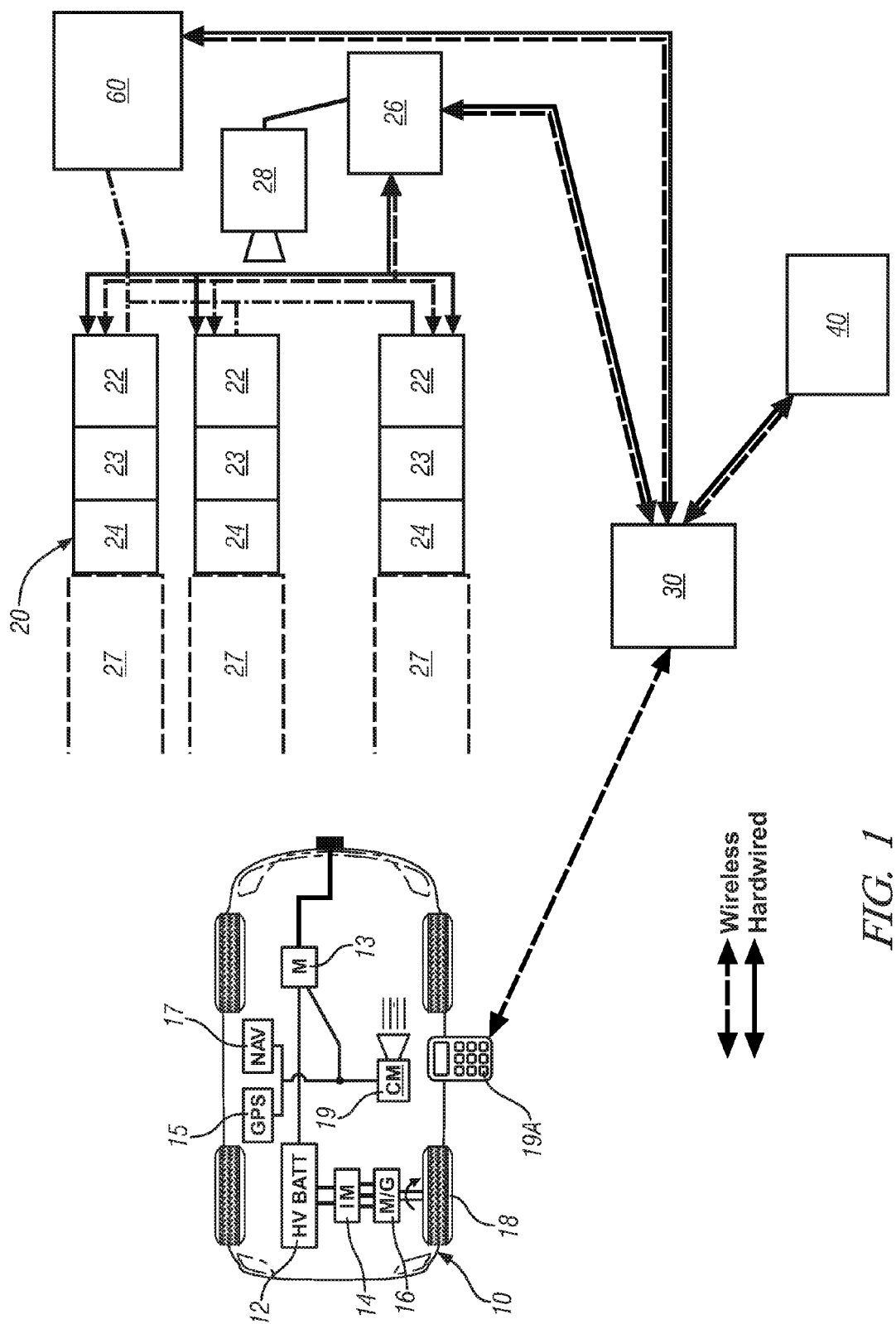
FIG. 1 is a schematic diagram of a charging management system for electrically charging a subject vehicle at a remote charging site using electric power originating from a stationary source of electrical power in accordance with the present disclosure.

Referring now to the drawings, wherein the showings are for the purpose of illustrating certain exemplary embodiments only and not for the purpose of limiting the same, FIG. 1 schematically illustrates a charging site 20 including a plurality of charging stalls 27 and corresponding electric power outlets 24 that electrically connect to a stationary source of electrical power, e.g., an electric power utility plant, via an electric power distribution system 60. Like numerals refer to like elements throughout the description. Electrical charging at the charging site 20 is managed using a remote access server 40 that includes a charging management system for charging electrically-powered vehicles. The remote access server 40 communicates with a monitoring controller 26 preferably located at or proximal to the charging site 20 via a communications network system 30. The remote access server 40 also communicates via the communications network system 30 with a subject vehicle 10, the electric power distribution system 60, and a utility grid monitoring system.

The electric power distribution system 60 includes an electric power utility plant that generates electric power that is transmitted via transmission lines to a plurality of local power networks, which are referred to herein as electric power distribution subsystems. Each electric power distribution subsystem preferably includes a distribution substation that steps down electric voltage before passing electric power through distribution lines to a plurality of distribution transformers which electrically connect to charging sites, e.g., charging site 20. It is appreciated that the electric power distribution system 60 includes multiple transmission lines, multiple distribution substations, multiple distribution transformers, and multiple charging sites 20. It is appreciated that the charging management system for electrically charging a subject vehicle 10 at a charging site 20 takes into account that there can be a plurality of electrically-powered vehicles that are simultaneously electrically charging across the electric power distribution system 60.

The subject vehicle 10 is an electrically-powered vehicle that may for example be one of an electric vehicle, a range-extended electric vehicle, and a plug-in hybrid electric vehicle. The subject vehicle 10 preferably has a propulsion system that uses electric power supplied from an on-board electrical energy storage device, hereafter referred to as a high-voltage battery (HV Batt) 12. It is appreciated that the high-voltage battery 12 can include one or more multi-cell devices, ultracapacitors, or other electrical energy storage devices fabricated from materials that may include lithium-ion and other materials, with the scope of this disclosure not limited thereby. The propulsion system includes the high-voltage battery 12 electrically coupled to an electric motor/generator (M/G) 16 via an electric power inverter (IM) 14. The electric motor/generator 16 converts electric energy to torque to provide propulsion power to one or more vehicle wheels 18. The high-voltage battery 12 electrically connects an electrical charger connector that electrically connects via a cable to the electric power outlet 24 at the charging site 20 during a vehicle key-off period. An on-board electric power meter 13 preferably controls electric power flow and monitors and records cumulative electric power flow to the high-voltage battery 12, preferably in kilowatt-hours (kW-h). The high-voltage battery 12 is recharged using electric power supplied from the electric power utility 60 via the electrical power distribution subsystem to which the charging site 20 is connected.

The subject vehicle 10 preferably includes a global positioning system (GPS) 15 that generates data that is useable to define a geographic location of the subject vehicle 10. The GPS 15 has a known resolution and accuracy. The subject vehicle 10 may also include a navigation system (NAV) 17. The electric power meter 13 is configured to monitor and record cumulative electrical power flow (e.g., in kW-h) transferred to the high-voltage battery 12 through the electrical charger connection. The electric power meter 13 is preferably configured to capture and record a time and date of an electrical charging event, a geographic location of the subject vehicle 10 including a location and identifying elements related to the charging site 20, the owner of the charging site 20, and a magnitude of cumulative electric power flow (e.g., kW-h) transferred to the subject vehicle 10. The subject vehicle 10 includes a control module (CM) 19 configured to monitor signal outputs from the electric power meter 13 and control electric power flow through the electric power meter 13. The control module 19 has a wireless telematics communications system capable of extra-vehicle communications, including communication via the communications network system 30 having wireless and hardwired communications capabilities. The control module 19 communicates vehicle identification information to the remote access server 40 including the vehicle owner and/or account name, time and date, the geographic location of the vehicle generated by the GPS 15 at known resolution and accuracy, and a presence of electric power flow thereat as indicated by the electric power meter 13. Vehicle identification information in the form of vehicle make, model, model year, VIN, color, and/or other parameters may also be communicated. The remote access server 40 is operative to command the control module 19 to control the electric power flow through the electric power meter 13 in one embodiment.

The charging site 20 includes a single one or a plurality of charging stalls 27 each with a corresponding electric power outlet 24. In one embodiment, each electric power outlet 24 electrically connects an individually controlled and monitored electric power usage meter 23 that is electrically connected to an individual power access control device 22 that electrically connects to the electric power distribution system 60. It is appreciated that each electric power outlet 24 may electrically connect to an individually monitored electric power usage meter 23 that electrically connects to the electric power distribution system 60 without any access control devices in one embodiment. The electric power usage meter 23 corresponds to a specific geographic location and is operative to monitor electricity parameters including, e.g., voltage, amperage, wattage, waveform, power factor, and power loss, and generates an output that is associated with a magnitude of cumulative electric power flow. It is appreciated that there can be a plurality of charging sites 20 associated with the system described herein.

A monitoring computer 26 controls the power access control device 22 to control magnitude of electric power flow from the charging site 20 to the electric power outlet 24. The monitoring computer 26 connects to the network system 30 via either or both wireless and wired communications schemes. It is appreciated that the charging site 20 can include any charging site, including those associated with the owner of the subject vehicle 10 and those owned by another entity. It is appreciated that the charging site 20 may include a single one or a plurality of electric power outlets 24, with each electric power outlet 24 having an individual power access control device 22 and an electric power usage meter 23 that is individually controlled and monitored. The monitoring computer 26 communicates via the network system 30 to the remote access server 40 and the utility grid monitoring system to transmit a magnitude of the cumulative electric power flow transferred to the subject vehicle 10.

The utility grid monitoring system includes monitoring devices and analytical tools that monitor and report on electric power flow in a portion of the electric power distribution system. The utility grid monitoring system monitors available supply of electric power and monitors electric power consumption in each electric power distribution subsystems. There can be a plurality of utility grid monitoring systems associated with an electric power distribution system. The utility grid monitoring system continuously monitors states of parameters associated with operation of the electric power distribution system 60, including frequency and amplitude of the transmitted electric power at various nodes.

The remote access server 40 preferably includes a computing system configured to provide data management functions associated with the electric power distribution system 60, including billing and account reconciliation, electrical charging management, and other functions.

The remote access server 40 communicates via the network system 30 with the monitoring computer 26 to control the power access control device 22 to manage electric power flow through the electric power outlet 24 to electrically charge the subject vehicle 10 parked at the corresponding charging stall 27. Controlling the power access control device 22 includes locking and unlocking the power access control device 22 to prevent and permit electric power flow through the electric power outlet 24 to the subject vehicle 10, and operating the power access control device 22 to control a magnitude of electric power flow therethrough to charge the subject vehicle 10. It is appreciated that other methods and devices can be employed to control magnitude of electric power flow from the electric power distribution system 60 to charge the subject vehicle 10. It is appreciated that the remote access server 40 communicates via the network system 30 with other monitoring computers to control power access control devices to prevent and permit electric power flow through the electric power outlet 24 to manage electrical charging of other electrically-powered vehicles.

The remote access server 40 executes a charging management system that includes subsystems for identifying a geographic location and an owner of the subject vehicle 10, resolving the geographic location of the subject vehicle 10 at a specific one of the charging stalls 27 and a corresponding electric power outlet 24 at the charging site 20 (all of which have a known geographic location), unlocking the electric power outlet 24, controlling a magnitude of electric power flow to the subject vehicle 10 while monitoring and recording a cumulative electric power flow, and communicating a magnitude of the cumulative electric power flow transferred to the subject vehicle 10 to a billing computer associated with the electric power utility 60, which can invoice, bill or otherwise collect payment from the owner of the subject vehicle 10 for the cumulative electric power flow to the subject vehicle 10.

The remote access server 40 communicates with the monitoring computer 26 to control power access to the identified electric power outlet 24 and the associated charging stall 27 (having a known geographic location) at the charging site 20. The remote access server 40 may query a Geographical Information Service (GIS) database to resolve the location of the subject vehicle 10 to a specific charging stall 27 in one embodiment. The electrical energy supplier credits an account of the owner of the charging site 20 for the electricity usage and bills an account of the vehicle owner for the electricity usage. The electrical energy supplier has a mechanism to adjust electrical energy bills to credit and debit individual accounts based on information provided by the subject vehicle 10.

In operation, there can be a plurality of contiguous charging stalls 27, each including an electric power outlet 24 electrically connected to a electric power usage metering device 23 electrically connected to an individual power access control device 22. The plurality of electric power usage metering devices 23 and the plurality of individual power access control devices 22 are each signally connected to the monitoring controller 26. A monitoring system (Monitor) 28 includes one or more devices that has been setup and trained to detect a presence or absence of a parked vehicle in each of the charging stalls 27. In one embodiment, the monitoring system 28 is a video monitoring system that includes one or more video devices that has been setup and trained to detect a presence or absence of a parked vehicle in each of the charging stalls 27 using captured images and pattern recognition software. When the monitoring system 28 is a video monitoring system, the video device may include a local security camera or other object sensing device and pattern recognition software. The monitoring system 28 monitors vehicles entering and exiting into each charging stall 27 and records a temporal point at which a vehicle is parked at each charging stall 27. The monitoring system 28 is connected to the monitoring controller 26 to communicate with the remote access server 40 via a wired or a wireless network system. In one embodiment, the monitoring system 28 uses data obtained from presently existing security cameras on commercial buildings to identify and isolate the subject vehicle 10 to a specific charging stall 27 with known geographic location. It is appreciated that there may be a plurality of monitoring controllers 26 and monitoring systems 28, each having associated charging stalls 27.

In operation, the monitoring system 28 monitors the plurality of charging stalls 27, seeking to detect presence or absence of a parked vehicle at each of the charging stalls 27. A first message is communicated from the subject vehicle 10 that includes geographic location information for the subject vehicle 10 with known accuracy and resolution levels and a corresponding temporal time/date stamp at which the subject vehicle 10 was stopped and keyed off. A second message is communicated from the monitoring controller 26 that indicates one of a presence and an absence of a parked vehicle at the one of the charging stalls 27 having a known geographic location, a temporal time/date stamp associated therewith, and preferably a status related to whether the parked vehicle is presently being charged at each of the charging stalls 27. The remote access server 40 resolves that the subject vehicle 10 is the parked vehicle at the one of the charging stalls 27 based upon the first and second messages. The individual power access control device 22 corresponding to the one of the charging stalls 27 is controlled to permit electric power flow through the electric power outlet 24 to electrically charge the subject vehicle 10 when it is electrically connected thereto. An exemplary system for executing the system described herein is set forth with reference to FIGS. 2, 3, and 4.

Figure 2:
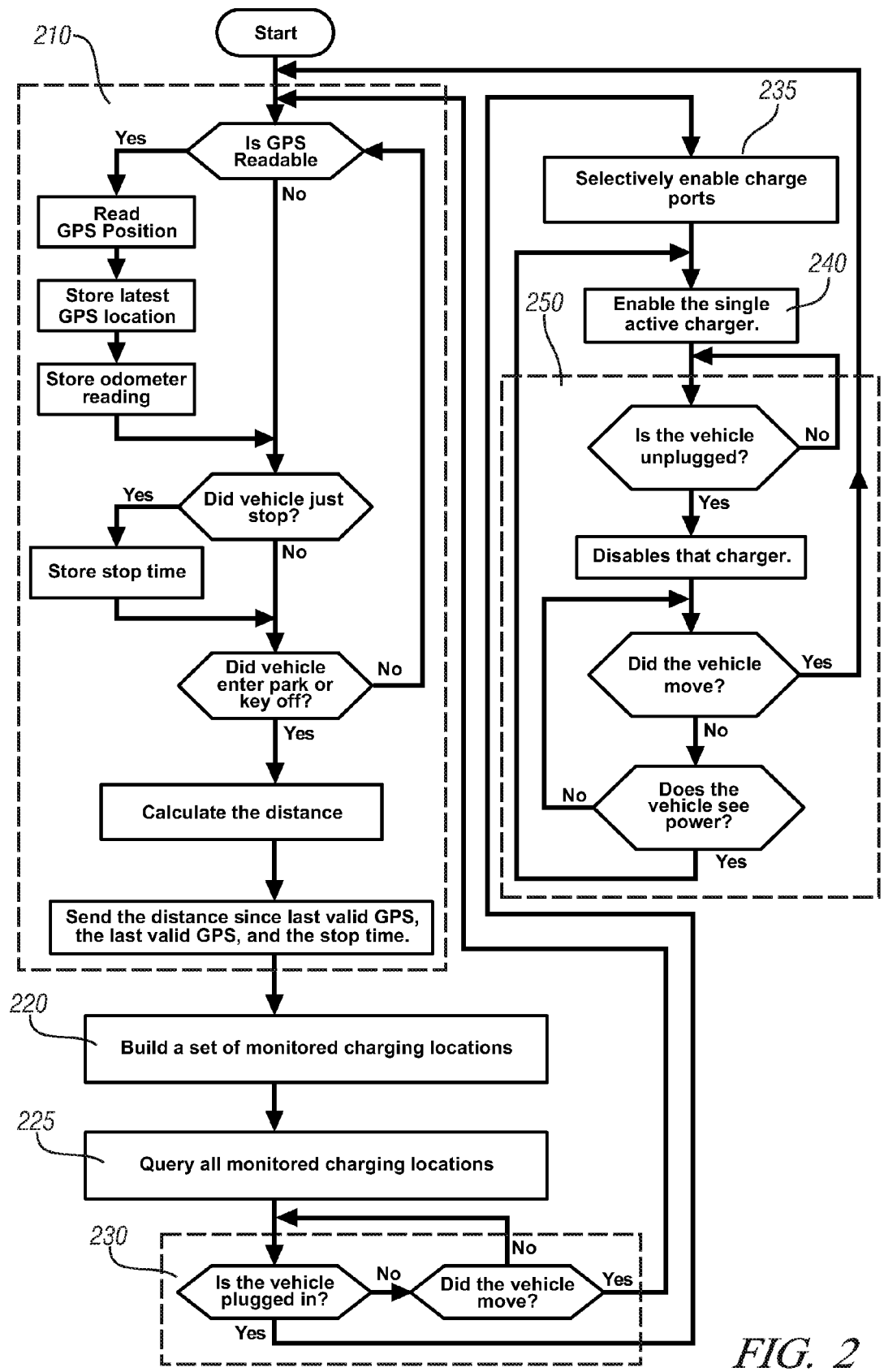
FIG. 2 is a flowchart showing overall operation of a system to monitor a plurality of charging stalls to detect presence or absence of a parked vehicle at each of the charging stalls and resolve that a subject vehicle is the parked vehicle at one of the charging stalls in accordance with the present disclosure.

FIG. 2 depicts a flowchart showing overall operation of the system to monitor a plurality of charging stalls 27, seeking to detect presence or absence of a parked vehicle at each of the charging stalls 27 and resolve that the subject vehicle 10 is the parked vehicle at one of the charging stalls 27. The subject vehicle 10 monitors geographic location information generated on-board. The subject vehicle 10 generates a message, i.e., the aforementioned first message, including geographic location information for the subject vehicle 10 originating from the GPS 15. The message includes geographic location information including a most-recent valid GPS reading for the subject vehicle 10 and an elapsed distance traveled by the subject vehicle 10 between the valid GPS reading and when the subject vehicle 10 was stopped and keyed off. The message includes a temporal time/date stamp at which the subject vehicle 10 was stopped and keyed off. Information from the optional navigation system 17 may also be included in the message. The subject vehicle 10 telematically communicates the message including the geographic location information to the remote access server 40. The on-vehicle GPS 15 reports the geographic location information for the subject vehicle 10 at known resolution levels including geographic position and accuracy. The accuracy of the GPS 15 may be such that the location of the subject vehicle 10 is not resolved to a specific one of the electric power outlets 24 (210).

The remote access server 40 generates a dataset of identified charging stalls 27 having known geographic locations in a location corresponding to the geographic location information provided by the subject vehicle 10, taking into account the most-recent valid GPS reading for the subject vehicle 10, the elapsed distance traveled by the subject vehicle 10 and allowable error (220). This can take the form of a geometric circle having the most-recent valid GPS reading for the subject vehicle 10 as the center point with a radius defined by the combination of the elapsed distance traveled by the subject vehicle 10 and the allowable error.

The remote access server 40 queries the monitoring controller(s) 26 associated with each of the charging stalls 27 in the aforementioned dataset corresponding to the geographic location information provided by the subject vehicle 10. Each monitoring controller(s) 26 associated with each of the charging stalls 27 in the aforementioned dataset identifies which of the charging stalls 27 in the aforementioned dataset has a vehicle parked thereat, an associated temporal time/date stamp, and preferably a status related to whether each parked vehicle is presently being charged. This information is used to generate the second message, which is periodically communicated to the remote access server 40. The second message preferably includes information provided by associated monitoring system(s) 28 indicating presence or absence of a parked vehicle at each of the charging stalls 27 having known geographic locations in the aforementioned dataset, including those charging stalls 27 which are not presently engaged in charging a parked vehicle. As is appreciated, there can be a single second message that is periodically communicated to the remote access server 40 when there is a single monitoring controller 26 associated with all of the charging stalls 27 in the aforementioned dataset. Alternatively, there can be a plurality of second messages periodically communicated to the remote access server 40 when there are multiple monitoring controllers 26 associated with all of the charging stalls 27 in the aforementioned dataset.

The periodically communicated second messages can be used to determine arrival and departure times corresponding to parked vehicles at each of the charging stalls 27 in the aforementioned dataset, which can then be correlated to an arrival time of the subject vehicle 10 to the charging stall 27, as communicated with the first message.

The remote access server 40 uses the first message, including GPS information originating from the subject vehicle 10 to localize it to the plurality of charging stalls 27, i.e., the aforementioned dataset corresponding to the geographic location information provided by the subject vehicle 10. The remote access server 40 uses time-stamp information from the second message(s) that are periodically communicated from the monitoring controller(s) 26 and the time-stamp information for the first message to resolve the location of the subject vehicle 10 to one of the plurality of charging stalls 27 within the range of the reported GPS location (225).

Figure 3:
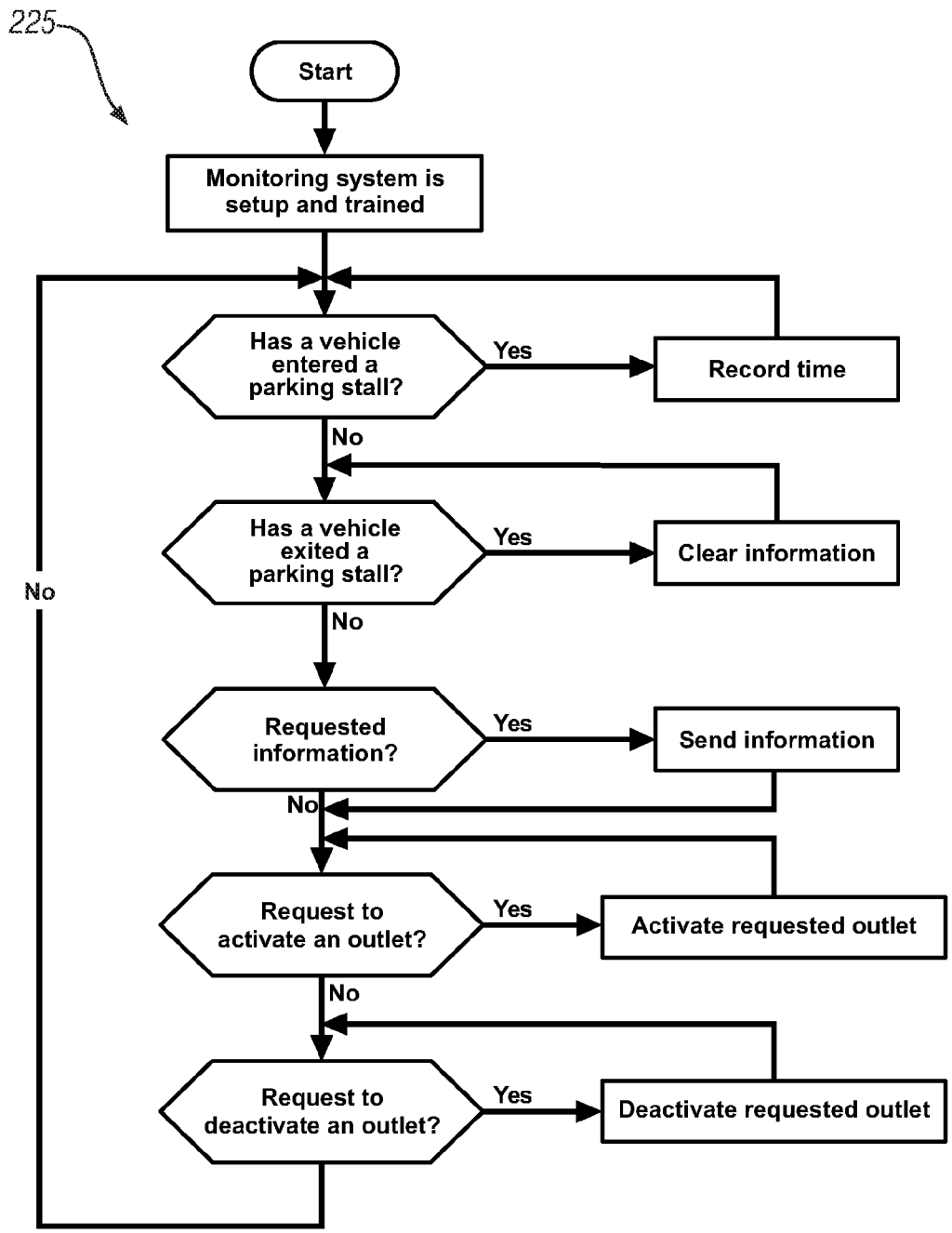
FIG. 3 depicts a process for querying monitoring controllers associated with charging stalls that correspond to geographic location information provided by a subject vehicle in accordance with the present disclosure.

An embodiment of a process for querying the monitoring controller(s) 26 associated with each of the charging stalls 27 in the aforementioned dataset that correspond to the geographic location information provided by the subject vehicle 10 is depicted with reference to FIG. 3. The process for querying the monitoring controller(s) 26 is intended to identify which of the charging stalls 27 in the aforementioned dataset a vehicle has entered and parked within a predetermined elapsed period of time, which can be correlated to the temporal time/date stamp at which the subject vehicle 10 was stopped and keyed off. The process includes setting up and training a monitoring system, e.g., monitoring system 28. The monitoring system 28 detects when a vehicle has entered a charging stall and records a time associated therewith. The monitoring system 28 detects when a vehicle has exited a charging stall and clears all present information for the charging stall associated therewith. Information requested by the remote access server 40 is communicated thereto. Actions requested by the remote access server 40 to activate and deactivate specific electric power outlets 24 are executed.

When the subject vehicle 10 connects to one of the electric power outlets 24 at one of the charging stalls 27, it communicates such information to the remote access server 40 (230). The remote access server 40 selectively enables and disables each of the charging stalls 27 in the aforementioned dataset corresponding to the geographic location information provided by the subject vehicle 10 to identify and thus resolve the location of the subject vehicle 10 to one of the plurality of charging stalls 27 that is supplying electrical power via its corresponding electric power outlet 24 to the subject vehicle 10 (235). One process to identify and thus resolve the location of the subject vehicle 10 to one of the plurality of charging stalls 27 that is supplying electrical power via its corresponding electric power outlet 24 to the subject vehicle 10 is described with reference to FIG. 4, which depicts a process of elimination using a testing set and a reserve set. The remote access server 40 identifies the charging stall 27 in which the subject vehicle 10 is parked, and enables activation of the electric power outlet 24 associated therewith (240). In one embodiment, the electric power outlet 24 associated with the identified charging stall 27 is a single charging stall in the reserve set identified using the process of elimination described with reference to FIG. 4.

Once identified, the operation of the identified charging stall 27 is monitored to detect presence or absence of the subject vehicle 10 to detect whether the subject vehicle 10 has been disconnected from the electric power outlet 24, and to detect whether the subject vehicle 10 had moved from the charging stall 27 (250). When the subject vehicle 10 unplugs from the electric power outlet 24, or otherwise moves, the remote electric power outlet 24 is disabled, and the process restarts. The on-vehicle control module 19 communicates the vehicle owner and/or account name, time and date, the geographic location and amount of electricity used to charge the subject vehicle 10 to the electrical energy supplier for billing.

FIG. 3 depicts in flowchart form an embodiment of a process for querying the monitoring controller(s) 26 associated with each of the charging stalls 27 in the aforementioned dataset that correspond to the geographic location information provided by the subject vehicle 10 (225). The monitoring controller(s) 26 are queried to identify specific one(s) of the charging stalls 27 in the aforementioned dataset in which a vehicle has entered and parked within a predetermined elapsed period of time. The predetermined elapsed period of time corresponds to the temporal time/date stamp at which the subject vehicle 10 was stopped and keyed off. The process for querying the monitoring controller(s) 26 is periodically executed to detect presence or absence of a parked vehicle in each of the plurality of charging stalls 27 in the aforementioned dataset. The monitoring system 28 monitors each of the charging stalls 27 and temporally records vehicles entering and exiting into each charging stall. The remote access server 40 monitors requests for activating and deactivating each of the electric power outlets 24 in the aforementioned dataset. The remote access server 40 periodically queries the monitored charging locations to obtain a list of all available parking slots within a predetermined time period. The monitoring system 28 monitors vehicles entering and exiting each charging stall 27 to record a temporal time/date that a vehicle was parked at each charging stall 27. The monitoring system 28 is connected with the monitoring controller 26. The monitoring controller 26 controls power access and electric power flow, monitors operation by the remote access server 40 to request information, and activates and deactivates the electric power outlet 24. The monitoring controller 26 periodically communicates a time-stamped message to the remote access server 40 indicative of presence of a parked vehicle in each of the charging stalls 27.

A message, i.e., the second message containing an image or a preprocessed result indicating presence or absence of a parked vehicle at each charging stall 27 is regularly and periodically communicated from the monitoring system 28 to the monitoring controller 26. The second message is communicated to the remote access server 40. The second message includes time-stamped information for each monitored charging stall 27 indicating whether it is occupied by a parked vehicle, and preferably a status related to whether the parked vehicle is presently being charged at the charging stall 27. Alternatively, the second message is communicated upon occurrence of an event, e.g., when a vehicle enters or exits a charging stall. The subject vehicle 10 generates a request to activate one of the charging stalls 27, which is communicated to the remote access server 40 when the subject vehicle 10 stops at one of the charging stalls 27. The remote access server 40 similarly monitors all requests to activate one or more charging stalls 27 associated with the monitoring controller(s) 26 in the aforementioned dataset that correspond to the geographic location information provided by the subject vehicle 10. The remote access server 40 seeks to identify in which of the charging stall(s) 27 associated with the aforementioned dataset charging has been activated within a predetermined elapsed period of time corresponding to the temporal time/date stamp at which the subject vehicle 10 was stopped and keyed off.

The remote access server 40 similarly monitors requests to deactivate one or more charging stalls 27 associated with the monitoring controller(s) 26 in the aforementioned dataset that correspond to the geographic location information provided by the subject vehicle 10. The remote access server 40 identifies which of the charging stalls 27 in the aforementioned dataset charging has been deactivated within a predetermined elapsed period of time corresponding to the temporal time/date stamp at which the subject vehicle 10 was stopped and keyed off.

Figure 4:
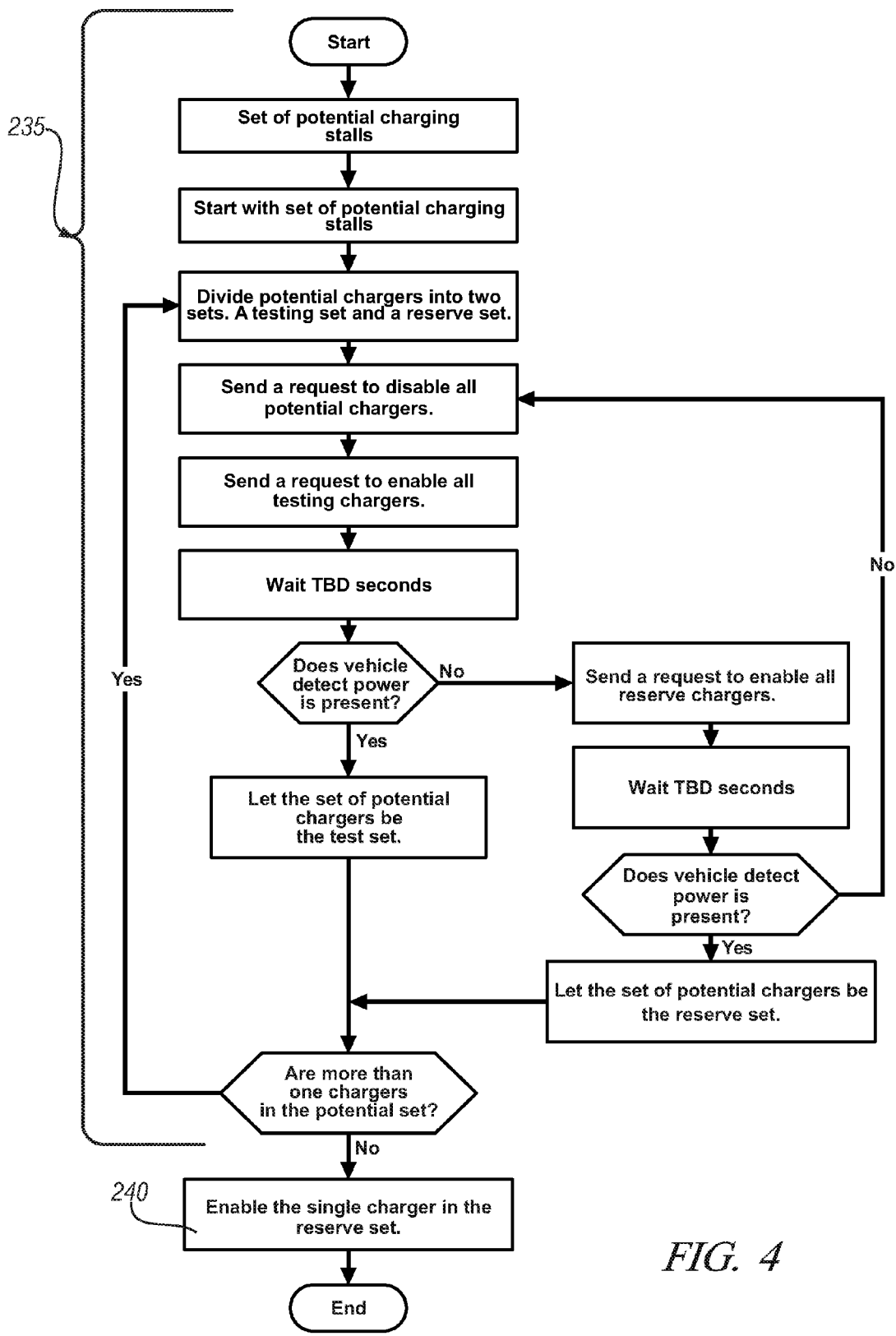
FIG. 4 depicts a process to selectively enable and disable electric power outlets to verify the specific charging stall into which a subject vehicle has entered and parked in accordance with the present disclosure.

FIG. 4 depicts a process to selectively enable and disable electric power outlets 24 to verify the specific charging stall into which the subject vehicle 27 has entered and parked (235). The process depicted is a process of elimination using a testing set and a reserve set to identify and thus resolve the location of the subject vehicle 10 to one of the plurality of charging stalls 27 that is supplying electrical power via its corresponding electric power outlet 24 to the subject vehicle 10. The remote access server 40 uses the queried information associated with all monitored charging locations, preferably using information from the monitoring controller(s) 26, to generate a list of the monitored charging stalls 27 into which vehicles entered within a predetermined period of time of the time reported by the subject vehicle 10 as of when it stopped which are also not presently charging. The remote access server 40 also detects that the subject vehicle 10 is plugged into the charging system. The remote access server 40 uses GPS information originating from the subject vehicle 10 to localize it to the plurality of charging stalls 27, and uses time-stamp information from a plurality of the messages periodically communicated from the monitoring controller(s) 26 to the remote access server 40 to identify potential arrival times for the subject vehicle 10 in one of the plurality of charging stalls 27 within the range of the reported GPS location. When there is a time-based correlation between the first message from the subject vehicle 10 and the second message including the potential arrival times for the subject vehicle 10, the remote access server 40 executes a protocol to activate and deactivate electric power outlets 24 corresponding to the plurality of charging stalls 27 to identify the specific charging stall and establishes an electrical connection by activating internet-controlled software for electrical charging of the subject vehicle 10. Various schemes can be used to robustly deal with variations in customer behavior.

The process to selectively enable and disable each of the electric power outlets 24 in the aforementioned dataset to verify the specific charging stall 27 into which the subject vehicle 10 has entered and parked within the predetermined elapsed period of time. The remote access server 40 selectively enables and disables each of the charging stalls 27 in the aforementioned dataset corresponding to the geographic location information provided by the subject vehicle 10 to identify and resolve the location of the subject vehicle 10 to one of the plurality of charging stalls 27 that is supplying electrical power via its corresponding electric power outlets 24 to the subject vehicle 10 using feedback from the subject vehicle 10. The process includes dividing all charging stalls 27 into one of a testing set and a reserve set. The remote access server 40 disables all the electric power outlets 24 associated with all the potential charging stalls 27 in the aforementioned dataset. The remote access server 40 then enables all the electric power outlets 24 associated with the testing set. The subject vehicle 10 uses the on-board electric power meter 13 to monitor to detect presence of electric power flow thereto, and communicates a message to the remote access server 40 indicating either the presence or absence of electric power thereat. The process of elimination includes selecting the one of the testing set and the reserve set that is associated with presence of electric power at the subject vehicle 10, and then dividing the charging stalls 27 associated with the selected one of the testing set and the reserve set into a new testing set and a new reserve set, enabling the charging stalls 27 associated with the test set, monitoring to detect presence of electric power, and selecting again. This process continues until a single active electric power outlet 24 for the subject vehicle 10 is enabled, and thus identified and resolved. The electric power outlet 24 associated with the identified charging stall 27 is the single charging stall in the reserve set identified using the process of elimination (240).

The system allows an operator of a plug-in hybrid vehicle, an extended range electric vehicle or an electric vehicle to recharge anywhere with the billing for the electricity properly reconciled. A commercial location can include hardware to automatically unlock the electric power outlet 24 and enable charging.

The system enables a basic electric charging station to identify vehicle charging stalls and resolve a specific vehicle thereto. This capability facilitates controlling and securing access and permits rebilling to a vehicle owner using presently existing security cameras on commercial buildings and existing vehicle infrastructures in one embodiment.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a charging stall having a known geographic location configured to electrically charge an electrically-powered vehicle, the method comprising:
 communicating a first message to a remote access server from a subject vehicle, the first message comprising geographic location information and temporal information corresponding to the subject vehicle;
 detecting a presence of a parked vehicle at the charging stall with a monitoring system signally connected to a monitoring controller;
 communicating a second message to the remote access server from the monitoring controller, the second message comprising temporal information corresponding to the detected presence of the parked vehicle at the charging stall;
 resolving that the parked vehicle at the charging stall comprises the subject vehicle based upon the first and second messages comprising correlating the geographic location information corresponding to the subject vehicle to the known geographic location of the charging stall and correlating the temporal information corresponding to the subject vehicle to the temporal information corresponding to the detected presence of the parked vehicle at the charging stall; and
 activating a power access control device at the charging stall to permit electric power flow through a corresponding electric power outlet.

2. Method for operating a charging stall having a known geographic location configured to electrically charge an electrically-powered vehicle, the method comprising:
 communicating a first message to a remote access server from a subject vehicle, the first message comprising geographic location information and temporal information corresponding to the subject vehicle;
 monitoring the charging stall to detect one of a presence and an absence of a parked vehicle thereat;
 periodically communicating a second message to the remote access server from a monitoring controller, the second message comprising temporal information corresponding to the detected one of the presence and the absence of the parked vehicle at the charging stall;
 resolving that the subject vehicle comprises the parked vehicle at the charging stall based upon the first message and the periodically communicated second message when the second message includes the detected presence of the parked vehicle at the charging stall, comprising correlating the geographic location information corresponding to the subject vehicle to the known geographic location of the charging stall and correlating the temporal information corresponding to the subject vehicle to the temporal information corresponding to the detected presence of the parked vehicle at the charging stall; and activating a power access control device at the charging stall to permit electric power flow through a corresponding electric power outlet subsequent to resolving that the subject vehicle comprises the parked vehicle at the charging stall.

3. The method of claim 2, wherein the temporal information corresponds to the subject vehicle when the subject vehicle was stopped and keyed off.

4. The method of claim 2, wherein monitoring the charging stall to detect one of the presence and the absence of the parked vehicle thereat comprises monitoring the charging stall with a video imaging system.

5. The method of claim 4, wherein the video imaging system monitors a plurality of charging stalls.

6. Charging system for an electrically-powered vehicle, comprising:

a charging stall having a known geographic location and including an electric power outlet;

a monitoring system for detecting a parked vehicle in the charging stall;

a monitoring computer signally connected to the monitoring system; and a remote access server receiving a first message communicated from a subject vehicle, the first message comprising geographic location information and temporal information corresponding to the subject vehicle, receiving a second message communicated from the monitoring computer, the second message comprising temporal information corresponding to the detection of the parked vehicle in the charging stall, resolving whether the parked vehicle detected at the charging stall is the subject vehicle based upon the first and second messages including correlating the geographic location information corresponding to the subject vehicle to the known geographic location of the charging stall and correlating the temporal information corresponding to the subject vehicle to the temporal information corresponding to the detection of the parked vehicle in the charging stall, and activating the electric power outlet when the parked vehicle detected in the charging stall is resolved to be the subject vehicle.

\* \* \* \* \*